United States Patent
Arai et al.

(10) Patent No.: US 8,274,911 B2
(45) Date of Patent: Sep. 25, 2012

(54) NETWORK MONITORING SYSTEM AND PATH EXTRACTING METHOD

(75) Inventors: Toshimasa Arai, Kawasaki (JP); Kiyoshi Sugita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 254 days.

(21) Appl. No.: 12/730,495

(22) Filed: Mar. 24, 2010

(65) Prior Publication Data

US 2010/0177658 A1 Jul. 15, 2010

Related U.S. Application Data

(63) Continuation of application No. PCT/JP2007/068694, filed on Sep. 26, 2007.

(51) Int. Cl.
H04L 12/26 (2006.01)
H04J 3/14 (2006.01)

(52) U.S. Cl. ........ 370/252; 370/235; 370/256; 370/392; 370/401

(58) Field of Classification Search .......... 370/235, 370/252, 248–249, 230–234, 241, 392, 388, 370/401
See application file for complete search history.

(56) References Cited

U.S. PATENT DOCUMENTS

| | | | | |
|---|---|---|---|---|
| 6,501,754 | B1 * | 12/2002 | Ohba et al. | 370/389 |
| 6,785,226 | B1 * | 8/2004 | Oltman et al. | 370/228 |
| 7,606,177 | B1 * | 10/2009 | Mahajan et al. | 370/256 |
| 2002/0176370 | A1 * | 11/2002 | Ohba et al. | 370/252 |
| 2005/0076140 | A1 * | 4/2005 | Fung | 709/245 |
| 2006/0013141 | A1 | 1/2006 | Mutoh et al. | |
| 2006/0026471 | A1 | 2/2006 | Kubota et al. | |
| 2006/0072460 | A1 | 4/2006 | Fukui et al. | |
| 2006/0285487 | A1 | 12/2006 | Yasuie et al. | |
| 2006/0285499 | A1 * | 12/2006 | Tzeng | 370/249 |
| 2007/0177600 | A1 | 8/2007 | Suzuki et al. | |
| 2008/0062874 | A1 * | 3/2008 | Shimadoi | 370/232 |

FOREIGN PATENT DOCUMENTS

| | | |
|---|---|---|
| JP | 2006-33275 | 2/2006 |
| JP | 2006-48162 | 2/2006 |
| JP | 2006-101094 | 4/2006 |
| JP | 2006-352763 | 12/2006 |
| JP | 2007-201966 | 8/2007 |

OTHER PUBLICATIONS

International Search Report dated Jan. 8, 2008, from the corresponding International Application.

* cited by examiner

Primary Examiner — Kwang B Yao
Assistant Examiner — Candal Elpenord
(74) Attorney, Agent, or Firm — Katten Muchin Rosenman LLP (57) ABSTRACT

A network monitoring system that monitors a communication network including plural communication apparatuses and includes an obtaining part for obtaining a transmission traffic amount and a reception traffic amount of each port of the plural communication apparatuses, a determining part for determining whether the transmission traffic amount is no less than a first threshold and whether the reception traffic amount is less than a second threshold for each port of the plural communication apparatuses, a storage part for storing connecting path data of the communication network therein, an extracting part for extracting a loop affected path, and an outputting part for outputting data of the loop affected path.

4 Claims, 9 Drawing Sheets

| PATH NAME | END POINT PORT X | END POINT PORT Y | VLANID |
|---|---|---|---|
| PATH 1 | APPARATUS A:PORT a1 | APPARATUS B:PORT b1 | - |
| PATH 2 | APPARATUS B:PORT b2 | APPARATUS C:PORT c1 | 3,5 |
| : | : | : | : |
| PATH n | APPARATUS N:PORT n | APPARATUS M:PORT m | - |

NETWORK MONITORING SYSTEM AND PATH EXTRACTING METHOD

CROSS-REFERENCE TO RELATED APPLICATIONS

This application is based upon and claims the benefit of priority of International Patent Application No. 2007-068694 filed on Sep. 26, 2007, the entire contents of which are incorporated herein by reference.

FIELD

The embodiments discussed herein are related to technology for detecting generation of a packet loop of, for example, a broadcast storm, in a layer 2 network. For example, a technology for extracting and displaying a path at which a packet loop is occurring and other paths affected by the packet loop.

BACKGROUND

A layer 2 network is formed of communication apparatuses including a layer 2 switch that performs switching of layer 2 frames (frames are also referred to as packets) such as Ethernet frames. Owing to the decrease in the cost of the communication apparatuses that form the layer 2 network and the increase in the communication rate of the layer 2 network, the use of the layer 2 network is rapidly becoming popular.

The layer 2 network is basically formed having a tree structure and designed to prevent generation of loop areas. As for documents related to the present application, there are Japanese Laid-Open Patent Application No. 2006-352763 and Japanese Laid-Open Patent Application No. 2006-33275.

Although paths in a layer 2 network are usually designed to avoid generation of loop areas, a loop path may be generated due to an error in the settings of a communications apparatus or an error in the connecting of cables. When packets flow into such loop path, a packet loop (packets infinitely circle inside a loop path) occurs.

In a case where the packet loop occurs, unicast packets are caused to continue circling inside a loop path and are prevented from reaching a target destination. Moreover, broadcast packets increase whenever the broadcast packets pass through communication apparatuses that constitute a loop path and continue circling in both directions of the loop path. The bandwidth of a network is filled to its upper limit by the increase of packets and results in a so-called congestion state. This causes a significant delay of communications and leads to disconnection of communications.

Further, because a server connected to the layer 2 network receives a huge amount of packets, the packet loop could adversely affect the maintaining of a network service provided by the server.

In a case of recovering a network when a packet loop occurs, first, the flow of packets is physically stopped by removing the cables of a loop route or a packet flow path inside a communication apparatus is logically disconnected by changing the settings of the communication apparatus. By physically stopping the flow of packets or logically disconnecting the packet flow path, the packet loop is stopped. Then, the content of a FDB (Forwarding Database), which is the switching route storage data of the communications apparatus constituting the loop route, is reset. Finally, the settings and route connections that caused the loop are investigated.

Next, a process where a packet loop is generated in a layer 2 network is described with reference to FIG. 1.

Figure 1:
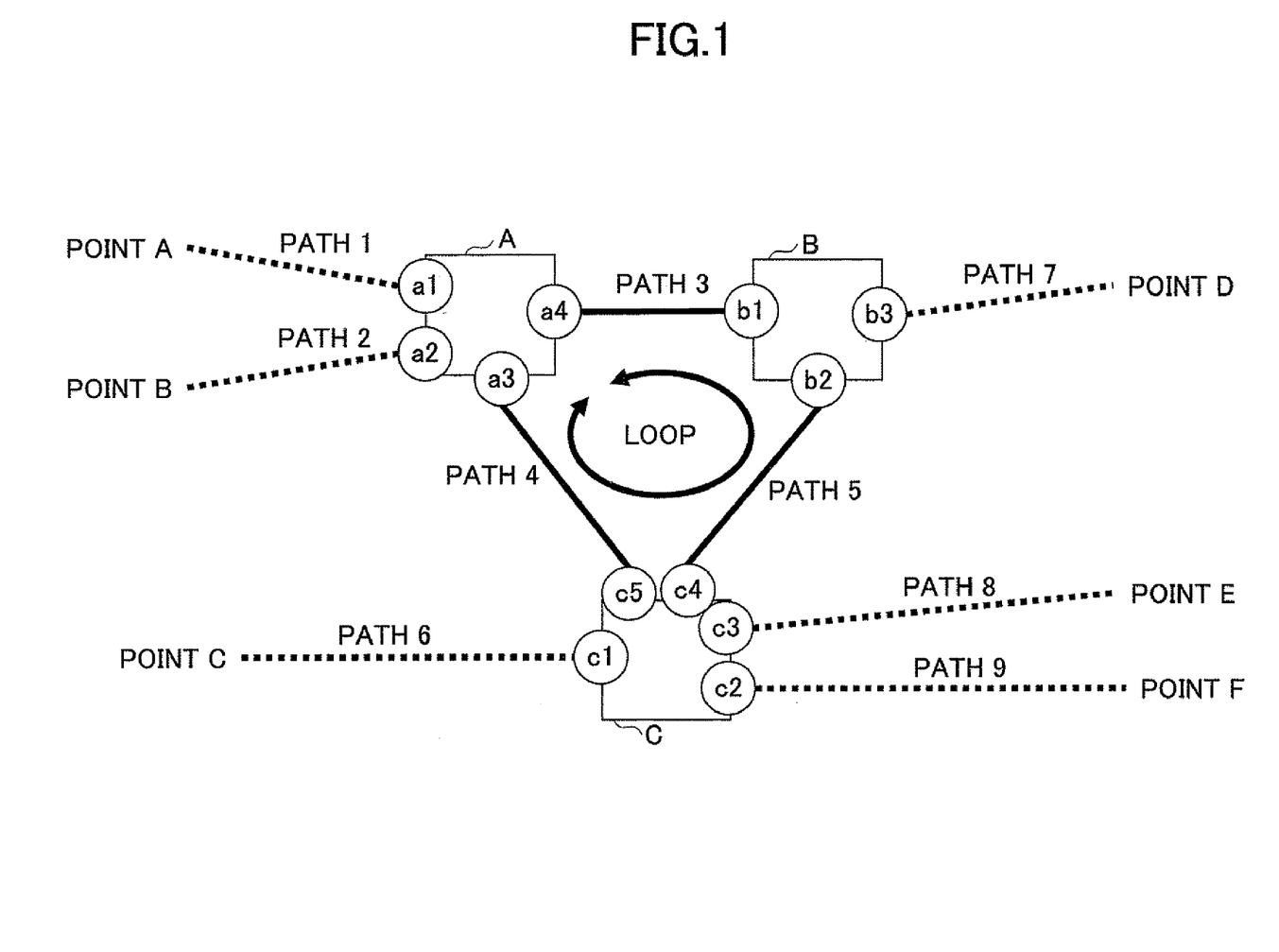
FIG. 1 is schematic diagram for describing a process where a packet loop is generated in a layer 2 network.

As illustrated in FIG. 1, the layer 2 network includes a switching apparatus A, a switching apparatus B, and a switching apparatus C. Further, a1, a2, a3, and a4 are the ports used by the switching apparatus A. Further, b1, b2, and b3 are the ports used by the switching apparatus B. Further, c1, c2, c3, c4, and c5 are the ports used by the switching apparatus C.

Path 1 in FIG. 1 indicates a connecting path between the port a1 of the switching apparatus A and a point A. Path 2 indicates a connecting path between the port a2 of the switching apparatus A and a point B. Path 3 indicates a connecting path between the port a4 of the switching apparatus A and the port b1 of the switching apparatus B. Path 4 indicates a connecting path between the port a3 of the switching apparatus A and the port c5 of the switching apparatus C.

Path 5 indicates a connecting path between the port b2 of the switching apparatus B and the port c4 of the switching apparatus C. Path 6 indicates a connecting path between the port c1 of the switching apparatus C and a point C. Path 7 indicates a connecting path between the port b3 of the switching apparatus B and a point D. Path 8 indicates the port c3 of the switching apparatus C and a point E. Path 9 indicates the port c2 of the switching apparatus C and a point F.

In the example illustrated in FIG. 1, the path 3, the path 4, and the path 5 form a loop. In a case where a broadcast packet flows into the loop from, for example, the point A, the switching apparatus A copies the broadcast packet and sends the copied broadcast packets to the port a2, the port a3, and the port a4. The copied packets that are passed through the ports a2-a4 are sent to corresponding opposite ends at wire speed. That is, the packet from the port a2 is sent to the point B; the packet from the port a3 is sent to the port c5 of the switching apparatus C; and the packet from the port a4 is sent to the port b1 of the switching apparatus B.

Then, the packet reaching the port b1 of the switching apparatus B is copied and sent to the port b2 and the port b3. The copied packets that are passed through the ports b2 and b3 are sent to corresponding opposite ends at wire speed. That is, the packet from the port b2 is sent to the port c4 of the switching apparatus C; and the packet from the port b3 is sent to the point D.

Then, the packet reaching the port c1 of the switching apparatus C is copied and sent to the port c1, the port c2, the port c3, and the port c5. The packet from the port c1 is sent to the point C. The packet from the port c2 is sent to the point F. The packet from the port c3 is sent to the point E. The packet from the port c5 is sent to the port a3 of the switching apparatus A. The packet reaching the port a3 of the switching apparatus A is copied and sent to the ports a2, a4, and a1.

As described above, the packet flowing into the port a4 of the loop path continues circling in a direction from path 3→path 5→path 4→path 3 . . . . Further, the packet flowing into the port a3 of the loop path continues circling in a direction from path 4→path 5→path 3→path 4 . . . . Because a packet is copied at each port of a switching apparatus whenever the packet reaches the switching apparatus, packets are also sent to the path 1, the path 2, the path 6, the path 7, the path 8, and the path 9 which do not include a port that constitutes the loop path.

Next, a process where a packet loop is generated in a layer 2 network that forms a VLAN is described with reference to FIG. 2.

Figure 2:
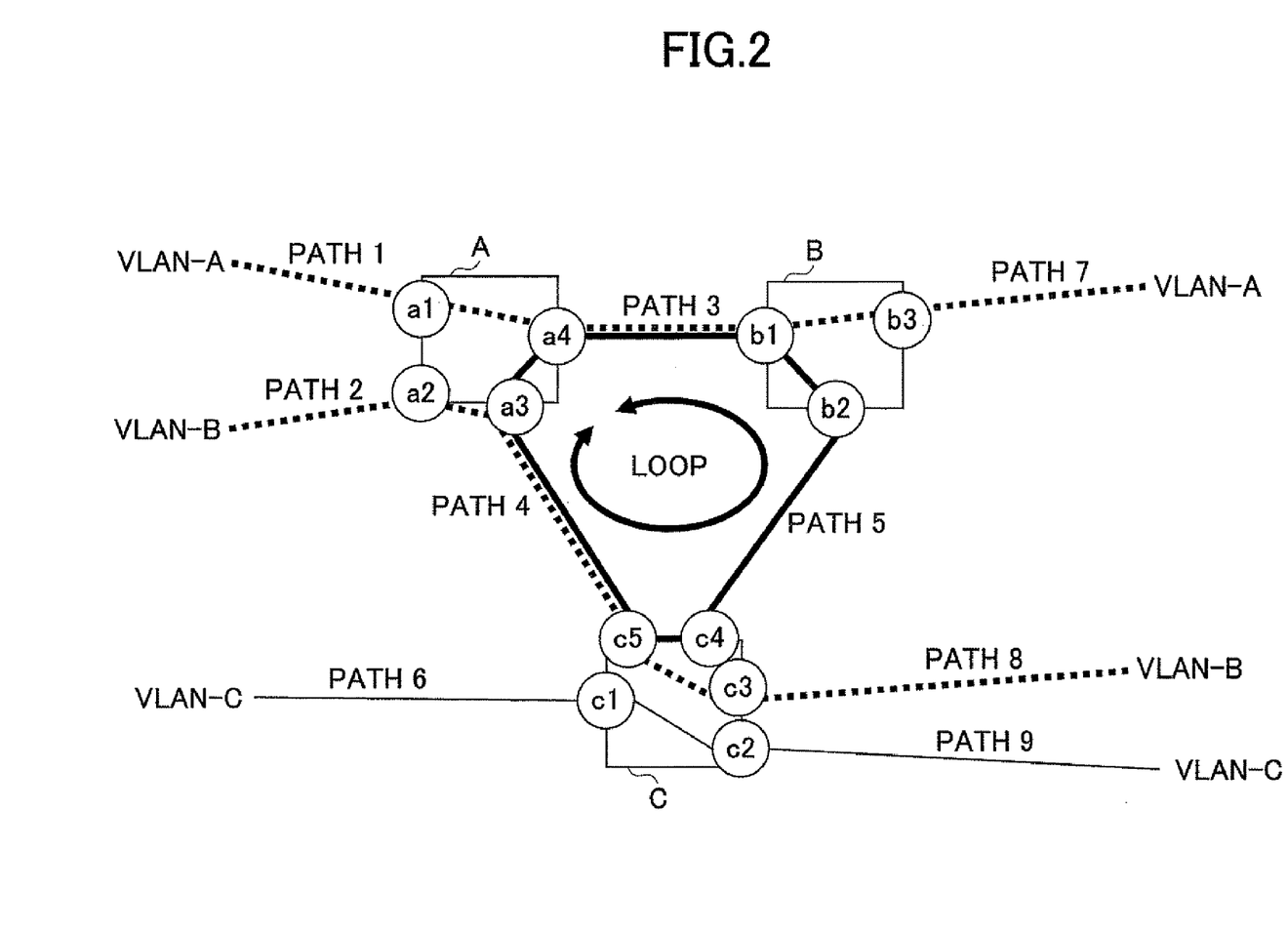
FIG. 2 is a schematic diagram for describing a process where a packet loop is generated in a layer 2 network including VLAN.

Similar to FIG. 1, FIG. 2 illustrates a layer 2 network including switching apparatuses A-C. In FIG. 2, VLAN-A is configured to pass through the ports a1 and a4 of the switching apparatus A and the ports b1 and b3 of the switching apparatus B. VLAN-B is configured to pass through the ports a2 and a3 of the switching apparatus A and the ports c5 and c3 of the switching apparatus C. Further, VLAN-C is configured to pass through the port c1 and c2 of the switching apparatus C.

For example, in a case where the path 3, the path 4, and the path 5 are connected as a VLAN, the packets of the VLAN-B will continue circling (loop) inside the VLAN of path 3, path 4, and path 5.

This affects the packets of the VLAN-A. That is, because the packets of VLAN-A and the packets of VLAN-B pass through the path 3, the large increase in the amount of packets flowing in the VLAN-B obstructs the flow of the packets of the VLAN-A. In this case, the packets of the VLAN-C are not affected by the packet loop because the VLAN-C is not connected to a loop path.

As for related art examples for detecting generation of a packet loop, there is a method of periodically sending Pings to the end points of a path. Because the bandwidth of a network path becomes congested in a case where a packet loop occurs, the generation of a packet loop can be detected by detecting abnormality in the traffic of packets.

However, even if generation of a packet loop can be detected, the path at which the packet loop is generated or the range affected by the packet loop cannot be perceived.

SUMMARY

An embodiment of the present invention provides a network monitoring system for monitoring a communication network including plural communication apparatuses, the network monitoring system including: an obtaining part configured to obtain a transmission traffic amount and a reception traffic amount of each port of the plural communication apparatuses; a determining part configured to determine whether the transmission traffic amount is no less than a first threshold and whether the reception traffic amount is less than a second threshold for each port of the plural communication apparatuses; a storage part configured to store connecting path data of the communication network therein; an extracting part configured to extract a loop affected path; and an outputting part configured to output data of the loop affected path extracted by the extracting part; wherein the loop affected path is a connecting path that includes a loop affected candidate port and is connected to a loop path, and wherein the loop affected candidate port is a port determined as having the transmission traffic amount that is no less than the first threshold and having the reception traffic amount that is less than the second threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Next, embodiments of the present invention are described with reference to the drawings.

Figure 3:
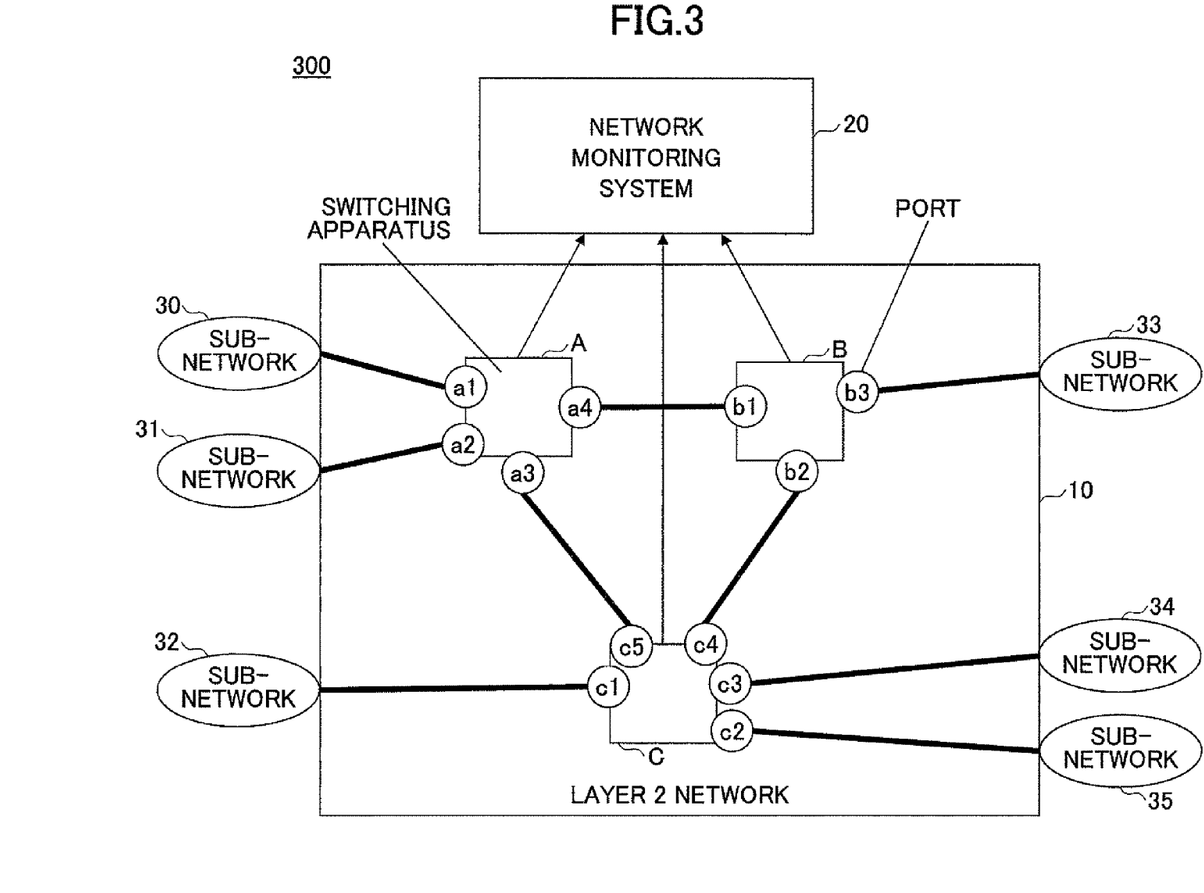
FIG. 3 is a schematic diagram illustrating a layer 2 network system according to an embodiment of the present invention.

FIG. 3 is a schematic diagram illustrating a layer 2 network system 300 according to an embodiment of the present invention.

As illustrated in FIG. 3, the layer 2 network system 300 includes a layer 2 network 10 and a network monitoring system 20 for monitoring the layer 2 network 10. Further, the layer 2 network 10 includes switching apparatuses A, B, and C which are communication apparatuses connected between the sub-networks 30 through 35. Each of the switching apparatuses A, B, C includes the same ports as the corresponding switching apparatuses A, B, C illustrated in FIGS. 1 and 2.

The network monitoring system 20 is connected to each of the switching apparatuses A, B, C of the layer 2 network 10 via in-band connection or via a maintenance network. The network monitoring system 20 can perform, for example, obtaining of monitor data or control with respect to each of the switching apparatuses A, B, C via in-band connection or a maintenance network.

Figure 4:
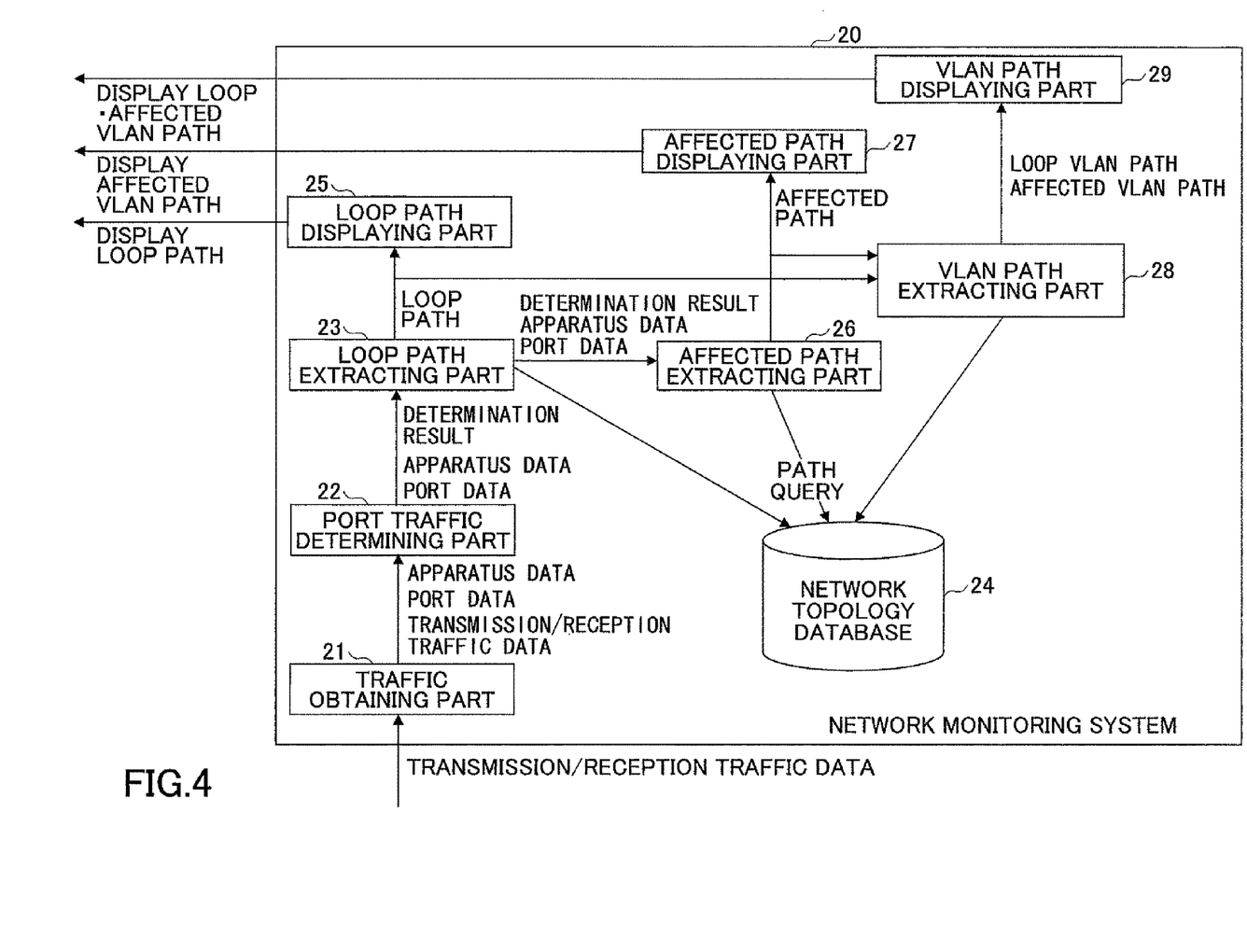
FIG. 4 is a schematic diagram illustrating a configuration of a network monitoring system according to an embodiment of the present invention.

Next, a configuration and functions of the network monitoring system 20 according to an embodiment of the present invention are illustrated in FIG. 4.

As illustrated in FIG. 4, the network monitoring system 20 includes function parts such as a traffic obtaining part 21, a port traffic determining part 22, a loop path extracting part 23, a network topology database 24, a loop path displaying part 25, an affected path extracting part 26, an affected path displaying part 27, a VLAN path extracting part 28, and a VLAN path displaying part 29.

The network monitoring system 20 may have a configuration of a single computer having one or more of the above-described function parts 21-29. Alternatively, the network monitoring system 20 may have a configuration including plural computers having one or more of the above-described function parts 21-29. Each of the function parts 21-29 may be realized by causing a computer to execute a corresponding program(s).

(Basic Operation)

First, a basic operation of the network monitoring system 20 according to an embodiment of the present invention is described with reference to the flowchart of FIG. 5.

The traffic obtaining part 21 obtains communication (transmission/reception) traffic data of each port from each of the switching apparatuses (in this embodiment, switching apparatuses A, B, C) constituting the layer 2 network 10 at predetermined cycles (traffic obtaining cycles T) (Step S1). As a method for obtaining transmission/reception traffic data, there is a method of obtaining MIB (Management Information Base) of transmission/reception traffic by using a standard management protocol of an IP (Internet Protocol) network such as SNMP (Simple Network Management Protocol). Alternatively, the network management system 20 may remotely send commands unique to each of the switching apparatuses A, B, C and obtain transmission/reception traffic included in the responses returned from the switching apparatuses A, B, C.

Further, apparatus data and port data of the switching apparatuses from which transmission/reception traffic data are to be obtained may be stored in the traffic obtaining part 21 beforehand. Alternatively, the traffic obtaining part 21 may obtain the apparatus data and the port data from a storage device inside the network monitoring system 20 or outside the network monitoring system 20. The traffic obtaining part 21 uses the apparatus data and the port data for uniquely identifying a target switching apparatus from which transmission/reception traffic data are to be obtained and obtaining the transmission/reception traffic data from the identified switching apparatus. The apparatus data of the switching apparatus may be, for example, an IP address of the switching apparatus, a host name of the switching apparatus, or both. The port data may be, for example, a port number.

In a case where the transmission/reception traffic data obtained from a switching apparatus by the traffic obtaining part 21 is a value accumulated after the switching apparatus is activated, the traffic obtaining part 21 obtains the amount of transmission/reception traffic data in time units by dividing the difference between the previously obtained transmission/reception traffic data and the currently obtained transmission/reception traffic data with the traffic obtaining cycles T.

For example, the traffic obtaining part 21 calculates the amount of transmission traffic (transmission traffic amount) per time and the amount of reception traffic (reception traffic amount) per time by using the formula below.

$$\Delta ts(n)=(ts(n)-ts(n-1))/T$$

$$\Delta tr(n)=(tr(n)-tr(n-1))/T$$

In this example, "$\Delta ts(n)$" represents transmission traffic amount per time, and "$\Delta tr(n)$" represents reception traffic amount per time. "$ts(n)$" represents transmission traffic amount obtained this time (currently obtained transmission traffic amount), and "$tr(n)$" represents reception traffic amount obtained this time (currently obtained reception traffic amount". Further, "$ts(n-1)$" represents transmission traffic amount obtained the previous time (previously obtained transmission traffic amount), and "$tr(n-1)$" represents reception traffic amount obtained the previous time. "T" represents a predetermined traffic obtaining cycle.

In Step S2, the traffic obtaining part 21 associates the obtained transmission/reception traffic data (i.e. amount of transmission traffic data (transmission traffic amount) and amount of reception traffic data (reception traffic amount)) for all ports subject to the traffic obtaining step with corresponding apparatus data and port data and transmits the transmission/reception traffic data associated to the apparatus data and the port data to the port traffic determining part 22. In the same manner as the traffic obtaining step, the traffic obtaining part 21 transmits the transmission/reception traffic data to the port traffic determining part 22 in predetermined traffic obtaining cycles T.

The port traffic determining part 22 receives the transmission traffic data and the reception traffic data associated to the apparatus data and the port data for all ports subjected to the traffic obtaining step from the traffic obtaining part 21.

In Step S3, the port traffic determining part 22 determines whether both the transmission traffic amount and the reception traffic amount are no less than a predetermined threshold (s). The threshold may be a value equal to an upper limit of the bandwidth of the port corresponding to the transmission traffic amount, the reception traffic amount, or both. Further, the value of the threshold may be discretionally designated by a user. The threshold for the transmission traffic and the threshold for the reception traffic may be different values.

In Step S3, in a case where the port traffic determining part 22 determines that both the transmission traffic amount and the reception traffic amount for a given port are no less than (i.e. equal to or greater than) the threshold, the traffic determining part 22 determines that the given port constitutes a loop path (loop path port). As a result of the determination, the traffic determining part 22 assigns a loop port identifier to the given port. That is, the loop port identifier is assigned to the apparatus data and the port data associated to the transmission traffic amount and the reception traffic amount.

In Step S4, the port traffic determining part 22 determines whether only the transmission traffic amount is no less than the threshold for each port. That is, the port traffic determining part 22 determines whether the transmission traffic amount is no less than the threshold and whether the reception traffic amount is less than the threshold. In a case where the port traffic determining part 22 determines that only the transmission traffic amount for a given port is no less than the threshold, the port traffic determining part 22 determines that the given port is a candidate having increasing output traffic due to a packet loop affecting the given port. As a result of the determination, the traffic determining part 22 assigns a loop affected port identifier to the given port (also referred to as "candidate affected path port"). That is, the loop affected port identifier is assigned to the apparatus data and the port data associated to the transmission traffic amount.

In Step S5, the port traffic determining part 22 determines whether there are any ports to which the loop port identifier is assigned based on the transmission/reception traffic data currently obtained from the traffic obtaining part 21. It is to be noted that this step S5 may be performed before Step S4. In a case where there are no ports to which the loop port identifier is assigned (No in Step S5), a next traffic obtaining process is performed according to a predetermined timing.

In a case where there is a port to which a loop port identifier is assigned (Yes in Step S5), the port traffic determining part 22 transmits the apparatus data and the port data being assigned with a determination result (a loop port identifier or a loop affected port identifier) to a loop path extracting part 23 (Step S6). It is to be noted that the apparatus data and the port data for a port having neither the loop port identifier nor the loop affected port identifier) assigned may also be transmitted to the loop path extracting part 23.

In a case where there is no port constituting a loop path, the port in which only transmission traffic amount is no less than the threshold cannot be determined as a port affected by a loop. Accordingly, in a case where there is no port for attaching a loop port identifier, apparatus data and port data are not transmitted to the loop path extracting part 23 even when there is a port in which only the transmission traffic amount is no less than the threshold. Further, in a case of not performing a step of extracting an affected path (described below), the process of Step S4 may be omitted.

The loop path extracting part 23 receives apparatus data and port data assigned with a determination result (loop port identifier) from the port traffic determining part 22.

Then, in Step S7, the loop path extracting part 23 searches a network topology database 24 by using the apparatus data and the port data assigned with the loop port identifier and extracts a loop path. That is, the loop path extracting part 23 extracts a connecting path that connects plural ports assigned with the loop port identifier. Since there may be a case where both the transmission traffic amount and the reception traffic amount of a port are no less than the threshold(s) due to a factor besides a loop, the loop path extracting part 23 may extract a connecting path only when the connecting path of the plural ports assigned with the loop port identifier constitute a loop.

The loop path extracting part 23 transmits data of the extracted loop path (loop path data) to a loop path displaying part 25. The loop path displaying part 25 receives the loop path data from the loop path extracting part 23 and outputs the loop path data to, for example, a display apparatus (not illustrated) so that a list of loop paths can be displayed by the display apparatus (Step S8). Alternatively, the loop path displaying part 25 may generate a topology image of a loop path based on the loop path data and output the generated topology image to the display apparatus.

Next, the network topology database 24 is described. The network topology database 24 is a database that maintains a path data table therein. The network topology database 24 may be provided by a storage apparatus in the network monitoring system 20 or a server outside the network monitoring system 20.

The network topology database 24 searches the path data table in response to queries from the loop path extracting part 23, the affected path extracting part 26, and the VLAN path extracting part 28 by using the apparatus data and the port data as keys and outputs (responds) a corresponding path.

Figure 6:
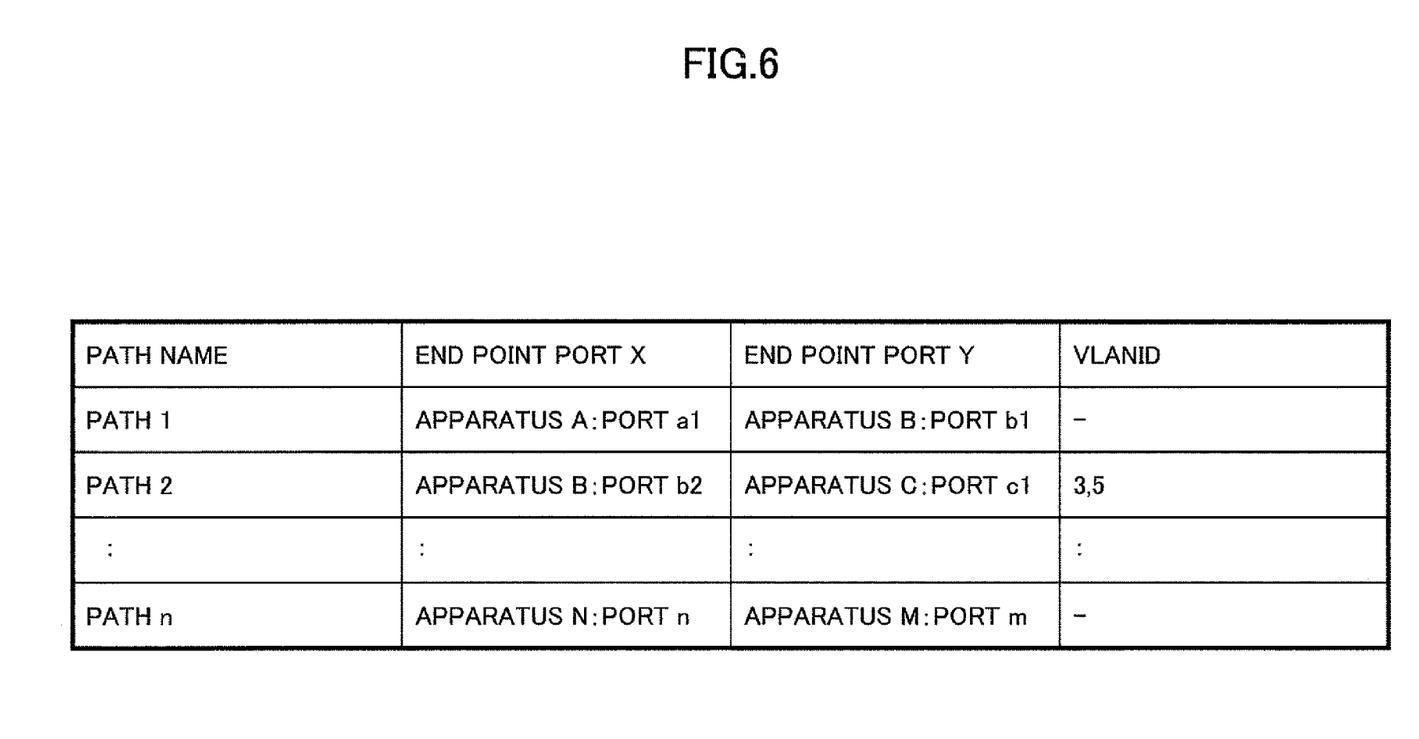
FIG. 6 is a schematic diagram illustrating an example of a configuration of a path data table.

Next, an exemplary configuration of a path data table is illustrated in FIG. 6. As illustrated in FIG. 6, the path data table includes, for example, items "path name", "end point port X", "end point port Y", and "VLANID". The "path name" is an arbitrary unique name indicating the name of a path connecting two switching apparatuses. The "end point port X" and the "end point port Y" indicate the ports of the two switching apparatuses located at the end points of the path connecting the two apparatuses. The "VLANID" is an ID of a VLAN packet flowing between the end point ports X and Y. The VLANID may be zero, one, or plural IDs. It is to be noted that the path data table of FIG. 6 illustrates a typical path data table and is not illustrated in correspondence with the configuration of FIG. 3.

In the configuration illustrated in FIG. 6, Path 1 indicates a path connecting a port a1 of a switching apparatus A and a port b1 of a switching apparatus B. Path 2 indicates a path connecting a port b2 of the switching apparatus B and a port c1 of a switching apparatus C and has packets of VLAN no. 3 and VLAN no. 5 flowing therethrough. It is to be noted that the path data table is fabricated by a network administrator. For example, by providing a function of automatically gathering data such as the port data of a network apparatus(es) to the network monitoring system 20, the path data table may be automatically fabricated.

For example, in a case where the loop path extracting part 23 receives data assigned with a loop port identifier (in this example, apparatus data corresponding to apparatus N and port data corresponding to port n, and apparatus data corresponding to apparatus M and port data corresponding to port m) from the port traffic determining part 22, the loop path extracting part 23 extract path n as one of the paths that constitute a loop. The loop path displaying part 25 starts a process for displaying the loop path including the extracted path.

As described above, because the network monitoring system 20 according to an embodiment of the present invention detects a port having a bandwidth clogged by traffic in both directions (transmitting direction and receiving direction) as the loop packets pass through the port, extracts a connecting path(s) of the plural detected ports, and displays the extracted connecting path(s), the user can easily understand that a packet loop is generated and identify (distinguish) the path at which the packet loop is generated.

(Affected Path Extracting Process)

Next, an operation of performing an affected path extracting process is described.

Figure 5:
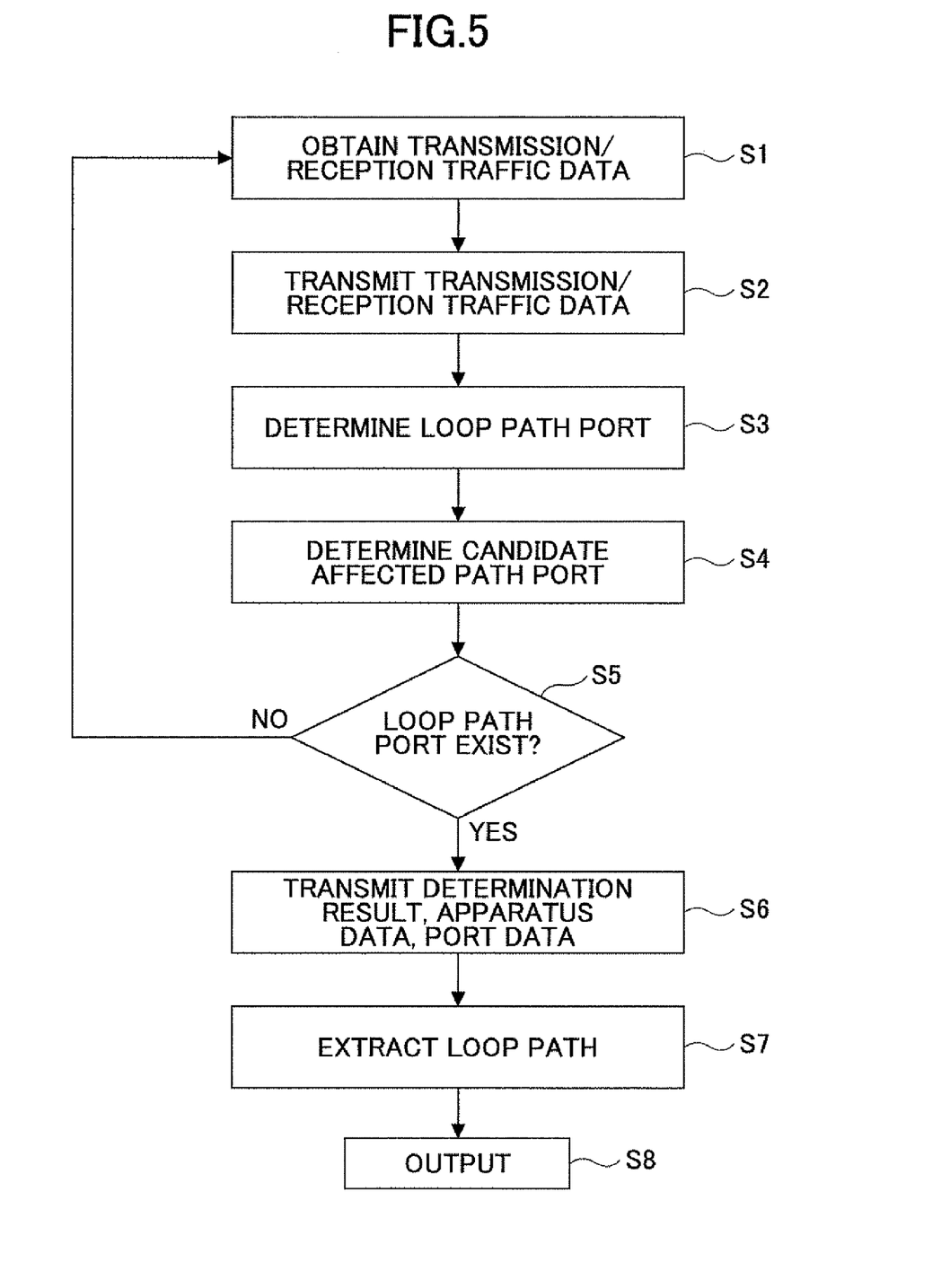
FIG. 5 is a flowchart illustrating a basic operation of a network monitoring system according to an embodiment of the present invention.

In Step S7 of the flowchart illustrated in FIG. 5, the loop path extracting part 23 transmits data received from the port traffic determining part 22 (determination result, apparatus data, port data) to the affected path extracting part 26. The affected path extracting part 26 performs the below-described affected path extracting operation.

The affected path extracting operation is described with reference to FIG. 7 (network configuration) and FIG. 8 (flowchart).

Figure 7:
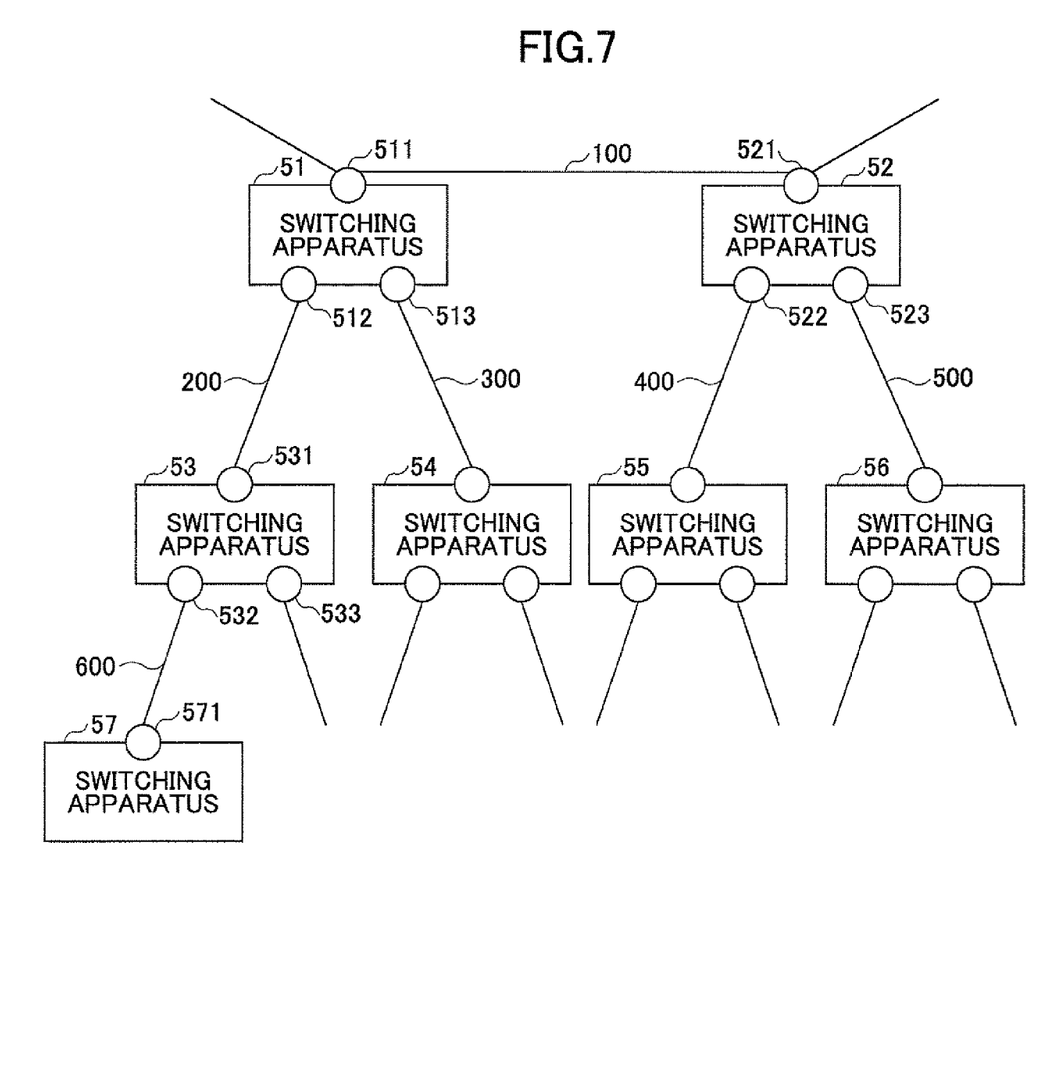
FIG. 7 is a schematic diagram illustrating a configuration of a network for describing an affected path extracting process performed by an affected path extracting part according to an embodiment of the present invention.

FIG. 7 is a schematic diagram illustrating an exemplary configuration of a portion of a given layer 2 network including switching apparatuses 51-57. Each of the switching apparatuses 51-57 have a port as illustrated in FIG. 7. The switching apparatus 51 and the switching apparatus 52 are connected by ports 511 and 521. The other switching apparatus 53-57 are also connected in the manner illustrated in FIG. 7. Although not illustrated, each of the other switching apparatus 53-57 may further be connected to other switching apparatuses.

In this example, a path 100 connecting the switching apparatus 51 and the switching apparatus 52 is a path constituting a loop. Further, the ports 512, 513 of the switching apparatus 51 and the ports 522, 523 of the switching apparatus 52 are affected by the loop. Loop affected port identifiers are assigned to the apparatus data and the port data of the ports 512, 513, 522, and 523. Further, loop affected port identifiers are also assigned to the apparatus data and the port data of the ports of the outer side of the switching apparatuses 53-57.

Next, an operation performed by the affected path extracting part 26 is described with reference to FIGS. 7 and 8.

The affected path extracting part 26 receives the apparatus data and the port data assigned with determination results (loop identifiers, loop affected port identifiers) from the loop path extracting part 23. In this example, the affected path extracting part 26 receives data containing data indicating the status of FIG. 7 (Step S11). The affected path extracting part 26 extracts one switching apparatus having a port determined to constitute a loop (i.e. assigned with loop identifier) (Steps S12 and S13). Although either one of the switching apparatuses 51, 52 is to be extracted in the example of FIG. 7, it is assumed that the switching apparatus 51 is extracted in the example of FIG. 7.

Then, the affected path extracting part 26 extracts one port to be subjected for processing from the ports determined to be affected by the loop (i.e. assigned with loop affected port identifier) (Steps S14, S15). In this example of FIG. 7, the affected path extracting part 26 extracts data of the port 512 of the switching apparatus 51. It is to be noted that, in a case where there are no loop affected ports in the extracted switching apparatus, the operation proceeds to processing of the next unprocessed switching apparatus (No in Step S14).

In Step S16, the affected path extracting part 26 searches the network topology database 24 by using the port data and the apparatus data assigned with loop affected port identifiers as keys and extracts a path including the port corresponding to the port data and the apparatus data assigned with loop affected port identifiers (current process target). In a case where the port 512 is the current process target in the example of FIG. 7, the path 200 is extracted.

Then, the affected path extracting part 26 searches the network topology database 24 for data of a port assigned with a loop affected port identifier among the ports of the switching apparatus located opposite from the current process target (opposite side apparatus) and extracts the corresponding port which is to be processed (Steps S17 and S18). It is, however, to be noted that the port located opposite from the port corresponding to the current process target in Step S16 is excluded from the port to be extracted. In the example of FIG. 7, the switching apparatus 53 is located at the opposite side from the port 512. Among the ports 523, 533 assigned with loop affected port identifiers, it is assumed that the port 532 is extracted in the example of FIG. 7. It is to be noted that, in a case where there are no loop affected ports in the switching apparatus located opposite from the current process target (No in Step S17), the operation proceeds to processing of the next unprocessed port (returns to Step S14).

In Step S19, the affected path extracting part 26 searches the network topology database 24 by using the extracted port data and the apparatus data as keys and extracts a path including the port corresponding to the extracted port data and the apparatus data. In a case where the port 532 is the current process target in the example of FIG. 7, the path 600 is extracted.

Then, the affected path extracting part 26 returns to Step S17 and searches for a port corresponding to the port data assigned with a loop affected port identifier among the ports of the switching apparatus (in the example of FIG. 7, switching apparatus 571) located opposite from the current process target (in the example of FIG. 7, port 532). In a case where there is no port corresponding to the port data assigned with a loop affected port identifier (No in Step S17), the operation proceeds to processing of the next unprocessed port (returns to Step S14). In the example of FIG. 7, although the affected path extracting part 26 searches for a port corresponding to the port data assigned with a loop affected port identifier among the ports of the switching apparatus 571, the switching apparatus 571 has no port corresponding to the port data assigned with a loop affected port identifier. Therefore, the operation proceeds to processing of the next unprocessed port.

The affected path extracting part 26 continues this operation until processing of all of the switching apparatuses and ports to be processed is completed. By performing the affected path extracting process, loop affected paths connected to the loop path can be extracted. In the example of FIG. 7, paths including the paths 200-600 are extracted.

Figure 8:
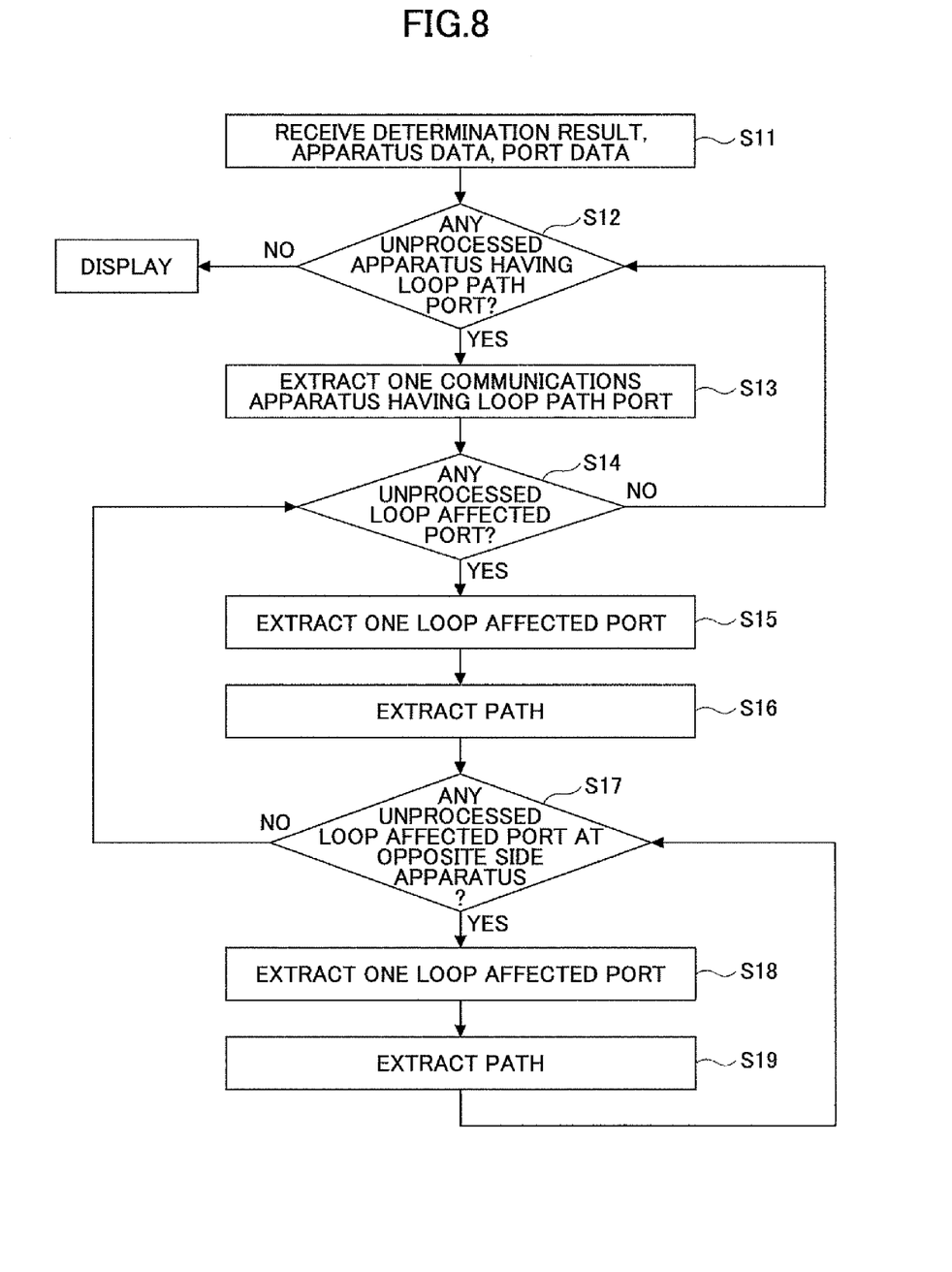
FIG. 8 is a flowchart illustrating an affected path extracting process performed by an affected path extracting part according to an embodiment of the present invention.

In the flowchart of FIG. 8, when processing of all of the switching apparatus and ports to be processed is completed, the determination of Step S12 becomes "NO". The affected path extracting part 26 transmits data of the extracted loop affected path (loop affected path data) to the affected path displaying part 27. The affected path displaying part 27 receives the loop affected path data from the affected path extracting part 27 and outputs a list of each path constituting the loop affected path based on the loop affected path data. The output list is to be displayed, for example, a display apparatus (not illustrated). Alternatively, the loop path displaying part 27 may generate a topology image of a loop path based on the loop path data and output the generated topology image to the display apparatus.

By performing the operation of the above-described loop affected path extracting process, the network monitoring system 20 can extract a path including a port having a bandwidth congested by transmission traffic and contacting a connecting path at which a packet loop exists. Further, the network monitoring system 20 can display the extracted path. Accordingly, a path(s) affected by the packet loop can be detected. Thereby, the user can grasp the generation of a packet loop, the path at which the packet loop is generated, and the path affected by the generation of the loop by referring to the loop path displaying part 25.

(VLAN Path Extracting Process)

Next, a VLAN path extracting process is described. After Step 7 of FIG. 5 is completed, the loop path extracting part 23 can extract a path having a VLANID from the one or more extracted loops by referring to the network topology database 24. The data of the extracted path having the VLANID can be transmitted to the VLAN path extracting path 28. The data to be transmitted to the VLAN path extracting part 28 may be assigned with an identifier indicative whether the path having a VLANID constitutes a loop. For example, in the configuration illustrated in FIG. 3, a loop that connects ports a3, c5, c4, b2, b1, a4, and a3 is generated. In a case where VLANID1 is assigned to the ports a3-cd, the loop path extracting part 23 transmits the data indicating the paths of the ports a3-cd and VLANID1 to the VLAN path extracting part 28.

Further, after the operation illustrated in FIG. 8 is completed, the affected path extracting part 26 extracts data of the path including the VLANID from the data of the extracted loop affected path and transmits the extracted data to the VLAN path extracting part 28. The extracted data transmitted to the VLAN path extracting part 28 may be assigned with an identifier indicating that the VLAN path is a loop affected path. For example, in a case where VLANID2 is assigned to the path 200 in the example illustrated in FIG. 7, the affected path extracting part 26 transmits data of the path 200 and the VLANID2 to the VLAN path extracting part 28.

The VLAN path extracting part 28 receiving the data from the affected path extracting part 26 searches the network topology database 24 using the VLANID as a key, extracts all of the paths that include the VLANID, and transmits the extracted data to the VLAN path displaying part 29. Then, the VLAN path displaying part 29 outputs the data from the VLAN path extracting part 28 and outputs the loop path data to, for example, a display apparatus (not illustrated) so that a list of loop paths including VLAN can be displayed by the display apparatus. Alternatively, the VLAN path displaying part 29 may generate a topology image of a loop path including VLAN based on the data from the VLAN extracting part 28.

For example, in a case where a VLAN of VLAN3 is set to a path connecting the sub-network 30, the port a1, the port a4, the port b1, the port b3, and the sub-network 33 according to the configuration illustrated in FIG. 3, the VLAN path displaying part 29 displays a VLAN path of VLAN3 (i.e. path connecting the sub-network 30, the port a1, the port a4, the port b1, the port b3, and the sub-network 33) when a path connecting the port a4 and the port b1 constitute a path of a loop. The VLAN path displaying part 29 may display the VLAN path of the VLAN3 in a manner allowing a part constituting the path of the loop to be distinguished from the other parts of the VLAN path.

The paths extracted from the VLAN path extracting part 28 include a VLAN path which uses all of or a part of the paths at which a loop is generated and the paths affected by the loop.

With the VLAN path extracting process, the network monitoring system 20 can extract and display a VLAN path overlapping a connecting path at which a packet loop exists. Thus, the loop path displaying part 25 enables the user to grasp the generation of a packet loop, the paths at which the packet loop is generated, and the paths affected by the packet loop. In addition, the VLAN path displaying part 29 enables the user to grasp the paths of each VLAN affected by the generation of the packet loop.

(Hardware Configuration of Network Monitoring System)

As described above, the network monitoring system 20 according to an embodiment of the present invention may have a configuration of a computer having one or more of the above-described function parts 21-29.

Figure 9:
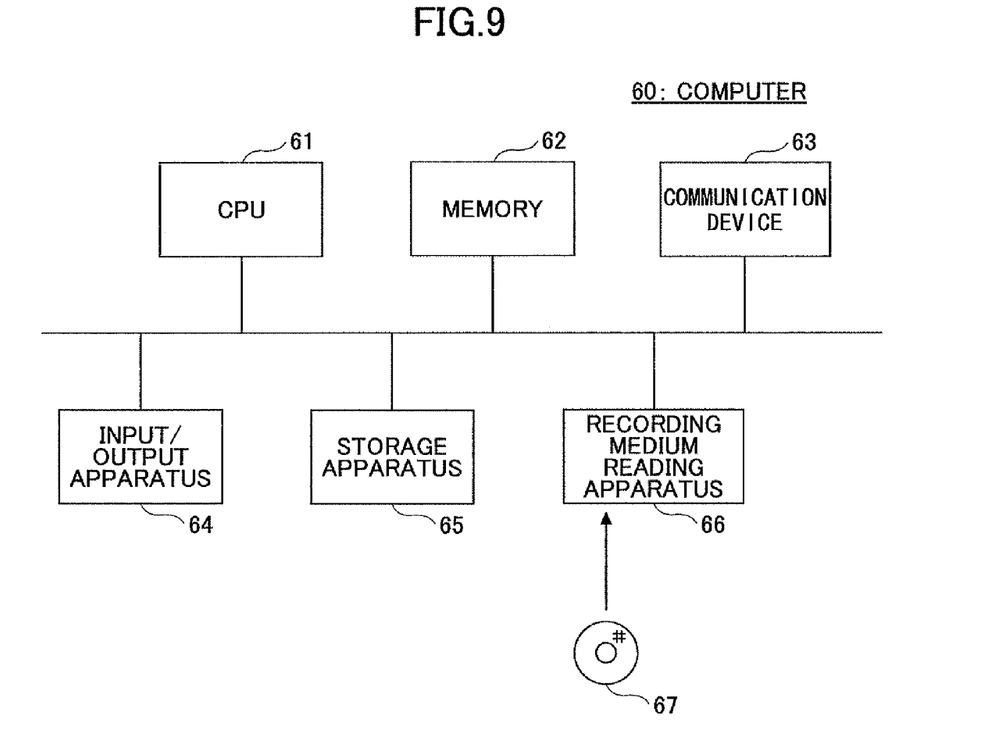
FIG. 9 is a schematic diagram illustrating an exemplary configuration of a computer used as a network monitoring system according to an embodiment of the present invention.

FIG. 9 illustrates an exemplary configuration of the computer 60 used as the network monitoring system 20 according to an embodiment of the present invention. As illustrated in FIG. 9, the computer 60 includes, for example, a CPU 61, a memory 62, a communication device 63, an input/output apparatus 64, a storage apparatus (e.g., hard disk drive), and a recording medium reading apparatus 66.

The program(s) used for performing the above-described processes according to an embodiment of the present invention may be read out from a computer-readable recording medium (e.g., CD-ROM) 67 by the recording medium reading apparatus 66 and installed into the computer 60. Further, the program(s) may be downloaded from a server via a network connected to the computer 60.

With the network monitoring system 20 according to the above-described embodiments of the present invention, the user can easily grasp the path at which a packet loop is generated, a path(s) affected by the generation of the packet loop, and the VLAN path in a case where a packet loop is generated. Accordingly, the length of time for searching the cause of the packet loop can be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network monitoring system for monitoring a communication network including a plurality of communication apparatuses, the network monitoring system comprising:
    an obtaining part configured to obtain a transmission traffic amount and a reception traffic amount of each port of the plural communication apparatuses;
    a determining part configured to determine whether the transmission traffic amount is no less than a first threshold and whether the reception traffic amount is less than a second threshold for each port of the plural communication apparatuses;
    a storage part configured to store connecting path data of the communication network therein;
    an extracting part configured to extract a loop affected path; and
    an outputting part configured to output data of the loop affected path extracted by the extracting part;
    wherein the loop affected path is a connecting path that includes a loop affected candidate port and is connected to a loop path,
    wherein the loop affected candidate port is a port determined as having the transmission traffic amount that is no less than the first threshold and having the reception traffic amount that is less than the second threshold,
    wherein the extracting part is configured to determine whether a communication apparatus including a port constituting the path extracted by the loop affected path extracting part includes the loop affected candidate port, and
    wherein the loop affected path extracted by the loop affected path extracting part is a connecting path including the loop affected candidate port in a case where the loop affected candidate port is included in the communication apparatus.

2. The network monitoring system as claimed in claim 1, further comprising:
    a VLAN path extracting part configured to extract the entire path of the VLAN from the storage part in a case where the loop affected path extracted by the loop affected path extracting part is used in the VLAN; and
    a VLAN path data outputting part configured to output data of the VLAN path extracted by the VLAN path extracting part.

3. A path extracting method executed by a network monitoring system for monitoring a communication network including a plurality of communication apparatuses, the method comprising:
    obtaining a transmission traffic amount and a reception traffic amount of each port of the plural communication apparatuses;
    determining whether the transmission traffic amount is no less than a first threshold and whether the reception traffic amount is less than a second threshold for each port of the plural communication apparatuses;
    extracting a loop affected path; and
    outputting data of the loop affected path extracted by the extracting of the loop affected path;
    wherein the loop affected path is a connecting path that includes a loop affected candidate port and is connected to the connecting path extracted by the extracting of the loop path,
    wherein the loop affected candidate port is a port determined as having the transmission traffic amount that is no less than the first threshold and having the reception traffic amount that is less than the second threshold,
    wherein the extracting of the loop affected path includes determining whether a communication apparatus including a port constituting the path extracted by the extracting of the loop affected path includes the loop affected candidate port, and
    wherein the loop affected path extracted by the extracting of the loop affected path is a connecting path including the loop affected candidate port in a case where the loop affected candidate port is included in the communication apparatus.

4. The method as claimed in claim 3, further comprising:
    extracting an entire path of a VLAN from the storage part in a case where the loop affected path extracted by the extracting of the loop affected path is used in the VLAN; and
    outputting data of the VLAN path extracted by the extracting of the VLAN path.

* * * * *